(No Model.)
A. W. STEELMAN & W. H. MAYNARD.
WHEEL CULTIVATOR.
No. 272,915. Patented Feb. 27, 1883.
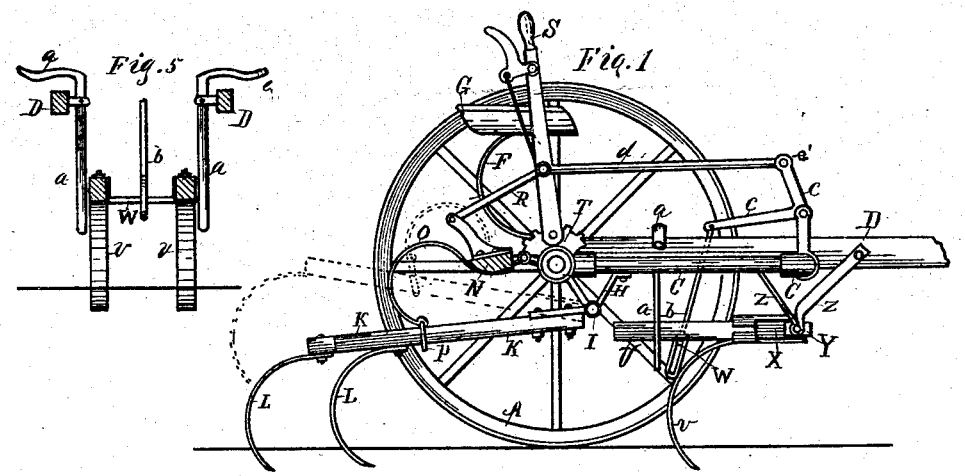
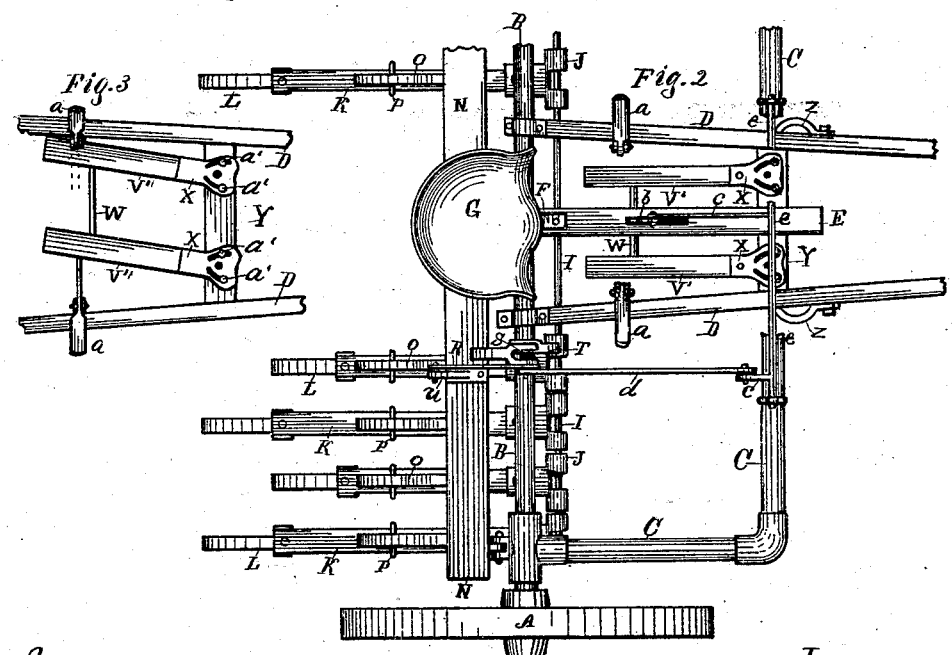
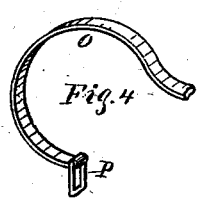
Attest.
John C Perkins
J. L. West
Inventor.
Albert W. Steelman
William H. Maynard
By Lucius C. West
Att'y

UNITED STATES PATENT OFFICE.

ALBERT W. STEELMAN AND WILLIAM H. MAYNARD, OF KALAMAZOO, MICH.

WHEEL-CULTIVATOR.

SPECIFICATION forming part of Letters Patent No. 272,915, dated February 27, 1883.

Application filed September 3, 1881. (No model.)

*To all whom it may concern:*

Be it known that we, ALBERT W. STEELMAN and WILLIAM H. MAYNARD, of Kalamazoo, in the county of Kalamazoo and State of Michigan, have invented a new and useful Improvement in Wheel-Cultivators, of which the following is a specification.

Our invention relates to such devices which are used both for harrowing land and for cultivating corn.

It has for its object improvements in the construction and combination of certain parts set forth in the following description.

In the drawings forming a part of this specification, Figure 1 is a side elevation; Fig. 2, top view of Fig. 1, with one side broken away; Fig. 3, detached top view of corn devices; Fig. 4, a spring detached, and Fig. 5 a rear view of Fig. 3.

K K are share-beams hinged to a rod at their forward end, as in former devices. Bar N, with which the lifting-lever S and springs O O are connected, is beveled on its under rear face, and it is hinged to the wheel-frame at its forward edge, all in a manner to effect the following result: The independent share-beams K, connecting with the bar N by means of the springs O, have an elastic effect imparted to them in their vertical movement, as in other constructions; but it will be observed that the springs are secured to the under beveled side of bar N in such a manner and location that when the lever S, connecting with bar N by means of link R, is carried forward to raise beams K a leverage purchase is exerted on springs O, contracting instead of expanding them, which brings a more immediate effect on said share-beams, with but a slight movement of the lever S; also, when lever S is thrown back, instead of the springs O being contracted to stiffen them, when desiring a greater pressure on the share-beams, they are rolled under, bringing the ends bearing the loops P nearer a point under bar N, where they would be contracted by any undue raising of the share-beams when the teeth L came in contact with harder soil. This is far more desirable than a contraction of the spring by means of the lever S, as less exertion is required and less distance in the movement of said lever.

Under the forward end of the frame C, at the center, is located the corn device, designed for dressing each side of the hill when the cultivator is used for corn, and to harrow the space left by leaving out the other share-beams in the rear of it. The beams v' v' are provided with castings x x, having semicircular slots, in which pivots a' a' are located, in securing them to the draft-beam y, in a manner that they may be swung laterally near the row of corn by means of the foot-treadles a a. When used for corn the teeth of beams K K harrow the soil between the rows. The advantage of thus pivoting beams v' v' is that the draft-power exerts a like purchase on each side of casting x.

c c are arms secured to the rocking bar e. One of said arms extends upward, and is pivotally connected with bar d, and the other arm extends rearwardly, and is pivotally connected with rod b. The lower end of rod b is provided with a loop, in which rod w is located. The rear end of bar d is pivoted to lever S.

R is a lever-bar, pivotally connecting the lifting-lever S with the spring supporting-beam N. By this arrangement the corn device and the share-beams may be both controlled in unison by means of the lifting-lever S.

The beams v' v' are connected by a bar, w, and said bar, which also connects with supporting-bar b, plays freely in the looped end of said bar b. The device is supported in a manner to be thrown from side to side by the pivoted foot-levers a a, and as said foot-levers are disconnected from the corn device, said device acts entirely independent of them when they are not used.

Having thus described our device, what we claim is—

1. In a wheel harrow or cultivator, the combination, substantially as described, of the hinged spring supporting-bar, having its under rear face beveled, the independently-hinged share-beams, a lifting-lever, and the pivotally-connecting lever-bar, with curved springs connecting said spring supporting-bar and share-beams, and adapted to operate as set forth.

2. In a wheel harrow or cultivator, the spring supporting-bar hinged to the wheel-frame, and having its under rear face beveled, independently-hinged share-beams provided with teeth or shares, curved springs connecting said share-beams and spring supporting-bar, and adapted to operate as set forth, and a lifting-lever, all in combination, substantially as described.

ALBERT W. STEELMAN.
WILLIAM H. MAYNARD.

Witnesses:
C. S. DAYTON,
C. A. PECK.